April 25, 1961    L. G. FISCHER ET AL    2,981,472
ELECTRO-MECHANICAL CORRELATOR MULTIPLIER
Filed Jan. 8, 1954    2 Sheets-Sheet 1

INVENTORS
LAURIN G. FISCHER
LANCE L. BIBBINS
BY
Ernest Fanwick
ATTORNEY

April 25, 1961  L. G. FISCHER ET AL  2,981,472
ELECTRO-MECHANICAL CORRELATOR MULTIPLIER
Filed Jan. 8, 1954
2 Sheets-Sheet 2

INVENTORS
LAURIN G. FISCHER
LANCE L. BIBBINS
BY
Ernest Fanwick
ATTORNEY

United States Patent Office 2,981,472
Patented Apr. 25, 1961

2,981,472
ELECTRO-MECHANICAL CORRELATOR MULTIPLIER

Laurin G. Fischer, North Arlington, and Lance L. Bibbins, Upper Montclair, N.J., assignors to International Telephone and Telegraph Corporation, Nutley, N.J., a corporation of Maryland Filed Jan. 8, 1954, Ser. No. 403,031
2 Claims. (Cl. 235—181)

This invention relates to correlators and more particularly to an electro-mechanical correlator multiplier.

Cross correlation is a technique whereby a received signal may be more easily detected by locally generating a correlation waveform having the same shape and periodicity as the desired signal, obtaining the product of the amplitude of the received signal and the correlating waveform and then integrating the resultant product. In effect the desired signal is compared with a perfect waveform, undisturbed by extraneous influences, and a resultant output can be obtained which represents the desired signal. Although completely electronic systems are known which perform the steps of cross correlation, they are extremely complex and limited to applications where weight and space requirements are not restrictive. A need has been felt for a simple device which could correlate a first input function with a second locally generated function without undue complexity. In addition, since correlation includes the step of multiplication it would be very desirable to provide a simple multiplication device. Most known multipliers are quite cumbersome usually because they are extremely flexible and may be utilized to multiply a signal by any function within limits. However, there is a definite need for a less flexible device which would naturally be far more simple. Such a simple device would be capable of multiplying a first function by a second specific function without undue complexity.

An object of this invention, therefore, is to provide an electro-mechanical multiplier which will yield the product of a first input cyclic function and a second preset specific cyclic function.

Another object of this invention is to provide an electro-mechanical correlator capable of yielding the cross correlation between a detected signal of known characteristics and a locally generated waveform having the same shape and periodicity as the desired signal.

Still another object of this invention is to provide an electro-mechanical correlator device which will automatically indicate the point of maximum correlation between a first input cyclic function and a locally generated second cyclic function without the necessity for excessive scanning.

One of the features of this invention is the provision of an electro-mechanical correlator-multiplier unit having an input element and an output element. One of the elements has an impedance characteristic which in conjunction with a relative cyclic movement between the input and output elements is variable according to a given cyclic function. When a second cyclic function signal is coupled to one of the elements and one of the elements is driven to obtain the relative motion, a multiplication of the two cyclic functions is obtained, the product of which can be coupled from the output element. By varying the phase of the moving elements and thus of the given cyclic function, a correlation can be obtained between the given cyclic function and the input cyclic function signal.

Another feature of this invention is to place in contact with a single impedance mandrel three output brushes disposed in time spaced relation respectively from each other such that three simultaneous correlation products are obtained between an input cyclic function and the function of the impedance element and the relative movement of the brushes. Each of the outputs will have a different value of time delay, thus permitting an indication of the maximum correlation value to be obtained without the need of continuously scanning the time delay factor by comparing the output of the middle brush to the output of either of the side brushes. When the middle brush has the greatest output the maximum correlation value is indicated.

The above-mentioned and other features and objects of this invention will become more apparent by reference to the following description taken in conjunction with the accompanying drawings, in which.

Figure 1A:
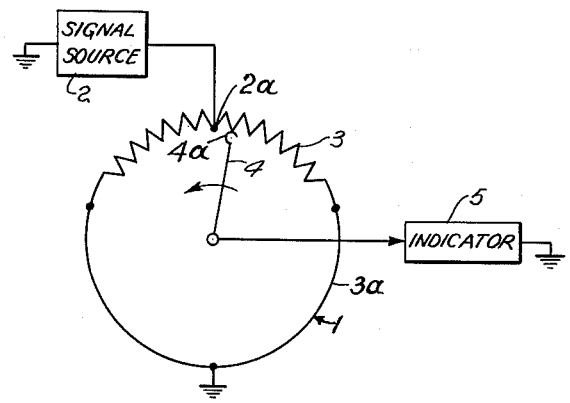
Fig. 1A illustrates one embodiment of an electro-mechanical multiplier in accordance with the provisions of this invention.

Referring to Fig. 1 of the drawing, a schematic illustration partly in block form of one embodiment of an electro-mechanical correlator unit in accordance with the principles of this invention is shown therein utilizing a potentiometer 1 having an input element comprising a resistor 3 and an output element comprising a movable brush 4. A signal source emitting signals in accordance with a first cyclic function is coupled to the input element 3 at coupling point 2a. The brush 4 is terminated in a wiping contact 4a. The wiping contact 4a is movable relative to the circumference of the potentiometer 1. The resistor 3 of potentiometer 1 is active through a portion of the circumference, the remaining portion 3a being a direct short. The relative movement of contact 4a along the circumference of potentiometer 1 in conjunction with the resistance characteristic of the resistive impedance 3 causes an impedance across potentiometer 1 which is variable in accordance with a second cyclic function. For example, if the impedance characteristic of resistance 3 is linear, it is seen that when wiper contact 4a is coupled to the short circuit portion 3a of the potentiometer 1 the output across indicator 5 is at a minimum since the energy coupled to point 2a is equally divided between either half of resistance 3 and is coupled out via arm 4. As the wiper contact 4a moves onto the impedance element 3 the amplitude of the output coupled from arm 4 starts to rise in linear fashion until a maximum is reached when the wiper contact 4a of arm 4 is opposite the input coupling 2a from signal source 2 and thus the energy coupled to point 2a is directly coupled to arm 4. As wiper contact 4a passes coupling point 2a the amplitude of the output starts to decrease in a linear fashion until the wiper contact 4a again makes contact with the short circuit portion 3a of the potentiometer 1.

Figure 1B:
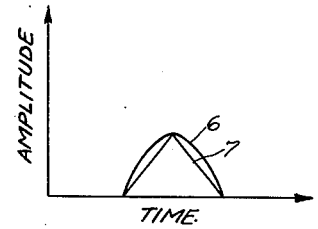
Fig. 1B is a graphic illustration helpful in the explanation of the embodiment shown in Fig. 1A.

Fig. 1B is a graphic illustration helpful in the explanation of the embodiment of the electro-mechanical correlator shown in Fig. 1A. Assume that the signal source 2 generates a first cyclic function signal of the characteristic shown by curve 6 and a second cyclic function, due to the relative movement between the resistance element 3 and wiping contact 4a and the impedance characterisic of resistance element 3, is generated as shown by curve 7, and heretofore explained, then the output shown by indicator 5 of Fig. 1 will be at a maximum when the maximum of the first cyclic function from source 2 coincides in time with the connection of the wiper contact 4a to the input signal terminal 2a. If the two are out of phase, then indicator 5 will show an amplitude which is less than maximum. If the device shown in Fig. 1A is to function as an electro-mechanical correlator, it is necessary that the second cyclic function generated by the impedance characteristic of resistance element 3 and the relative motion of the resistance element 3 and wiper contact 4a generate a signal substantially the same shape and periodicity as the first cyclic function from signal source 2. To achieve maximum correlation it is necessary that both the first cyclic function and the second cyclic function be time coincident. If the embodiment shown in Fig. 1A is to function as a multiplier, it is necessary that the second cyclic function generated by potentiometer 1 be equivalent to the multiplier and the first cyclic function signal from source 2 be equivalent to the multiplicand and the product will be shown by indicator 5.

Figure 2A:
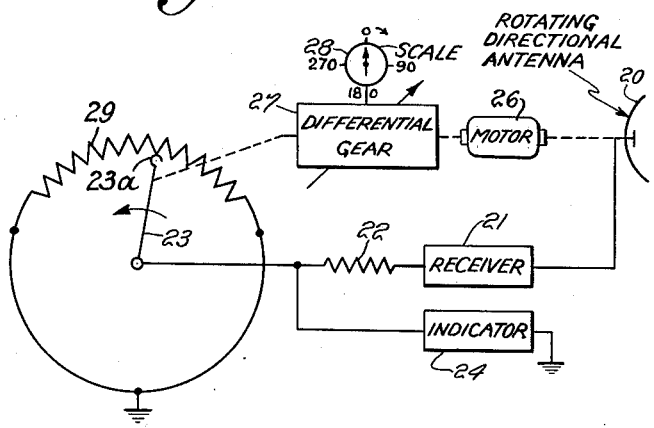
Fig. 2A is a schematic diagram partly in block form of an alternate embodiment of the electro-mechanical correlator of this invention.
Figure 2B:
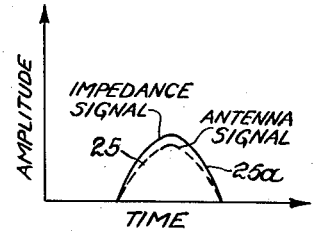
Fig. 2B is a graphic illustration helpful in the explanation of the embodiment shown in Fig. 2A.

Referring to Fig. 2A, an alternate embodiment of the electro-mechanical correlator unit of this invention is shown for use in a direction finding system wherein a rotating directional antenna 20 has its output coupled to a receiver 21 and then across a high impedance coupling resistor 22 to rotate a brush 23 which is terminated by a wiping contact 23a connected to a resistive impedance 29. An indicator unit 24 is coupled between the wiper brush arm 23 and the coupling resistor 22. The output of receiver 21 due to signals picked up by the rotating directional antenna 20 comprises a first cyclic function and a second cyclic function is created by relative movement of wiping contact 23a coupled to resistance element 29 in conjunction with the impedance characteristic of the resistance element 29. As shown in curve 25a, Fig. 2B, the second cyclic function which may be considered locally generated simulates the shape and periodicity of the first cyclic function shown by curve 25. A motor 26 drives rotating directional antenna 20 and also drives the wiper brush arm 23. Maximum correlation occurs when the rotation of wiper arm 23 is coordinated with the signals picked up by the directional antenna 20 as shown in Fig. 2B. If the wiper arm 23 and thus the second cyclic function is out of phase with the rotating directional antenna and thus the first cyclic function, maximum correlation is not achieved. In such a case it is necessary to retard or advance the rotation of wiper arm 23. Differential gear 27 is coupled between the motor 26 and the wiper arm 23 in order to advance or retard the rotation of arm 23 relative to the rotating directional antenna 20. The amount of retarding or advancing of wiper arm 23 due to the adjustment of differential gear 27 can be indicated on scale 28. If both the wiper arm 23 and rotating directional antenna 20 start rotating at the same speed from a predetermined direction and differential gear 27 is adjusted to correct the phase between the rotation of antenna 20 and wiper arm 23 to achieve an indication on indicator 24 of maximum correlation the amount of adjustment read on scale 28 will indicate the azimuth deviation of the direction of maximum signal picked up by antenna 20 from the starting direction. Thus, the adjustment of differential gear 27 which is necessary to achieve maximum correlation as shown by indicator 24 will represent the direction of the received signal which is observable on scale 28 coupled to differential gear 27.

Figure 3:
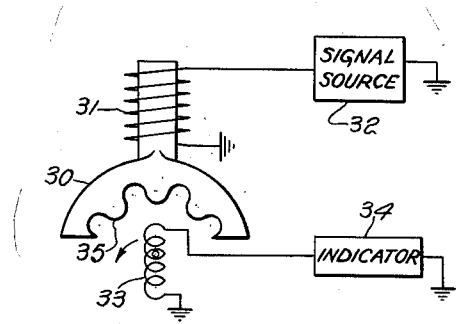
Fig. 3 is a schematic diagram of an embodiment of the correlator unit of this invention utilizing inductive impedances.

Referring to Fig. 3, an electro-mechanical correlation unit in accordance with the principles of this invention is shown wherein the impedance element utilized to generate the local function is inductive rather than resistive. A stator 30 is provided as an input element around which an inductive winding 31 is wound. The signal source 32 whose output is a first cyclic function is coupled to the stator winding 31. An inductive coupling loop 33 is moved relative to the input element in a manner similar to the movement of the wiper arm in Figs. 1A and 2A and the correlation output is shown by indicator 34. The second cyclic function is set into the stator 30 by shaping the pole face as indicated by 35 which in conjunction with the relative movement of the stator 30 and rotor 33 varies the coupling in accordance with a second cyclic function. It will be obvious to those skilled in the art that an air wound stator coil may be provided in place of the iron core pole 30 and the second cyclic function is arrived at by utilizing a variable pitch or varying distance between the air wound coil and the rotating stator.

Figure 4:
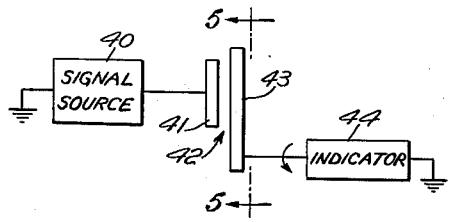
Figs. 4 and 5 are schematic diagrams of a correlator unit of this invention utilizing capacitive impedances.
Figure 5:
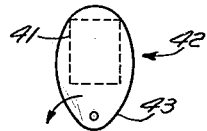

Referring to Figs. 4 and 5, an electro-mechanical correlator unit is shown wherein capacitive impedance is utilized in place of the previously explained resistive and inductive impedances. A signal source 40 characterized by a first cyclic function couples the input signal to a first plate 41 of a capacitor 42. The second rotating plate 43 of the capacitor 42 is coupled to an indicator 44. Considering the relative movement between elements, rotating plate 43 is shaped in accordance with the desired second cyclic function to be locally generated and the output will be the product of the second cyclic function (the shape of the rotating plate 43) plus the relative movement and the input signal from source 40.

Figure 6:
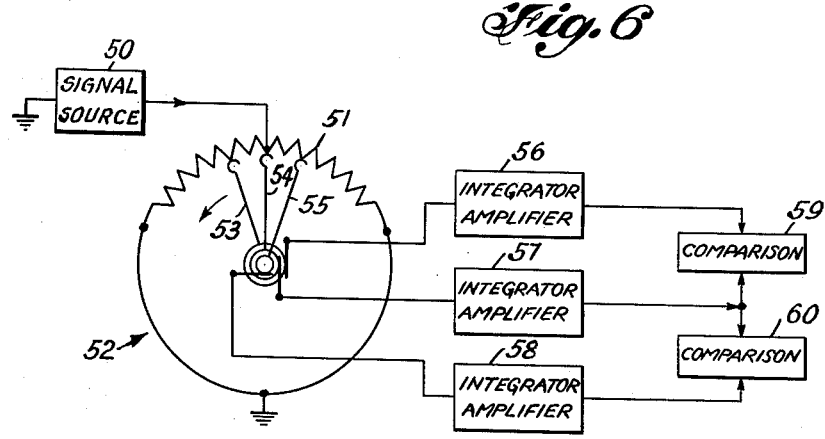
Figs. 6 and 7 are schematic diagrams partly in block form of the electro-mechanical correlator of this invention for automatically yielding the maximum correlation value.
Figure 7:
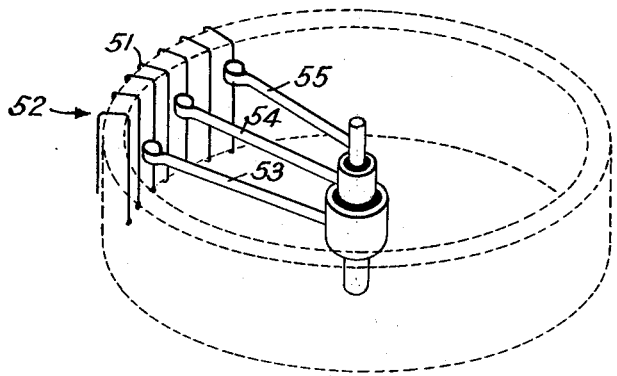

Referring to Figs. 6 and 7 of the drawing, an electro-mechanical correlating unit utilizing three rotating brushes is shown whereby an indication of maximum correlation is obtained without excessive scanning. An input signal from source 50 characterized by a first cyclic function is coupled to the resistance element 51 of a potentiometer 52. A plurality of brushes 53, 54 and 55 spaced, for example, 10° apart are rotated around the periphery of the resistance element 51. The output from each of the brushes 53–55 is coupled to integrator and amplifier circuits 56, 57, and 58, respectively. The integrated output from the center brush 54 is compared with the integrated output from either of the side brushes 53 and 55 in comparison circuits 59 and 60, respectively. It is obvious that when the indications on comparison circuits 59 and 60 are equal, brushes 53–55 are rotated in phase with the input from the signal function source 50 and thus maximum correlation is achieved. If the indications on comparison circuits 59 and 60 are not equal, the rotation of brushes 53–55 can be either retarded or advanced until an equality of indication is achieved, thus indicating maximum correlation. By maintaining equality of indication in the outputs of comparison circuits 59 and 60 maximum correlation is continuous.

While we have described above the principles of our invention in connection with specific apparatus, it is to be clearly understood that this description is made only by way of example and not as a limitation to the scope of our invention as set forth in the objects thereof and in the accompanying claims.

We claim:
1. A device for obtaining the maximum correlation product of two cyclic functions comprising a source of signals characterized by a first cyclic function, an impedance element having a mid-point and two parts disposed in opposite electrical relation with respect to said mid-point, means coupling said signal source to the mid-point of said impedance element, a plurality of output elements, said two parts having an impedance characteristic which in conjunction with a relative cyclic movement between said impedance and each of said output elements is variable according to a second cyclic function, driving means to produce said relative cyclic movement, means to vary the phase of said driving means relative to said first cyclic function, means to couple the output from each of said output elements, means to integrate the coupled output of each of said output elements and means to compare the integrated output from pairs of said output elements.

2. A device for obtaining the maximum correlation product of two cyclic functions comprising a source of signals characterized by a first cyclic function, an impedance element having a mid-point and two parts disposed in opposite electrical relation with respect to said mid-point, means coupling said signal source to the mid-point of said impedance element, at least two output elements disposed for variable coupling with respect to the two parts of said impedance element, the two parts of said impedance element having an impedance characteristic which in conjunction with a relative cyclic movement between said impedance and each of said output elements is variable according to a second cyclic function, driving means to produce said relative cyclic movement, means to vary the phase of said driving means relative to said first cyclic function, means to integrate the output of each of said output elements and means to compare the integrated output of said output elements.

References Cited in the file of this patent

UNITED STATES PATENTS

| | | |
|---|---|---|
| 2,208,623 | Bond | July 23, 1940 |
| 2,241,615 | Plebanski | May 13, 1941 |
| 2,527,753 | McConnell | Oct. 31, 1950 |
| 2,561,140 | Schaefer | July 17, 1951 |
| 2,594,317 | Lancor | Apr. 29, 1952 |
| 2,625,327 | Agins | Jan. 13, 1953 |
| 2,676,206 | Bennett et al. | Apr. 20, 1954 |

OTHER REFERENCES

Electronic Engineering (July 1947), Electrical Analogue Computing by D. J. Mynall (page 214).